United States Patent [19]

Bell

[11] 4,195,281
[45] Mar. 25, 1980

[54] LAMP OUTAGE INDICATOR CIRCUIT
[75] Inventor: Robert E. Bell, Harper Woods, Mich.
[73] Assignee: Essex Group, Inc., Fort Wayne, Ind.
[21] Appl. No.: 915,840
[22] Filed: Jun. 15, 1978

Related U.S. Application Data

[63] Continuation-in-part of Ser. No. 779,662, Mar. 21, 1977, abandoned.
[51] Int. Cl.$^2$ .................. G08B 23/00; H05B 37/03; B60Q 11/00
[52] U.S. Cl. .................. 340/79; 315/82; 340/641
[58] Field of Search .................. 340/79, 641, 642; 315/134, 82, 77, 83

[56] References Cited

U.S. PATENT DOCUMENTS

| | | | |
|---|---|---|---|
| 2,071,911 | 2/1937 | Young | 340/641 |
| 3,391,302 | 7/1968 | Weingarden | 315/83 |
| 3,604,949 | 9/1971 | Conzelmann et al. | 315/77 |
| 3,660,813 | 5/1972 | Rumpf | 340/641 |
| 3,735,378 | 5/1973 | McNamee | 340/642 X |
| 3,774,188 | 11/1973 | Bial et al. | 340/641 |
| 3,883,777 | 5/1975 | Morita | 340/641 |

FOREIGN PATENT DOCUMENTS

2366145  6/1978  France ................ 340/642

OTHER PUBLICATIONS

A. Yanischeff-"Resistor Testor", *IBM Technical Disclosure Bulletin*, vol. 3, No. 5, p. 1368.

*Primary Examiner*—Donald J. Yusko
*Attorney, Agent, or Firm*—Lawrence E. Freiburger; Robert D. Sommer

[57] ABSTRACT

A lamp outage indicator circuit for sensing and indicating outage of remotely located lamps in a vehicle. The lamp outage indicator employs a semiconductor sensing device to sense the voltage excursion which occurs when a lamp burns out. The sensing semiconductor is located in a bridge circuit to negate the effects of voltage and temperature fluctuations on the operating point of the circuit. Further, the sensing semiconductor device is located in the circuit so that in the normal operating state, a reference semiconductor device is on while the sensing semiconductor device is off. Lamp outage causes the current to shift from the reference semiconductor device to the sensing semiconductor device so as to turn the reference device off, and the sensing device on to energize an appropriate indicator. In one embodiment, the sensing semiconductor device is a light emitting diode while in a second embodiment, the sensing semiconductor device is a transistor.

7 Claims, 7 Drawing Figures

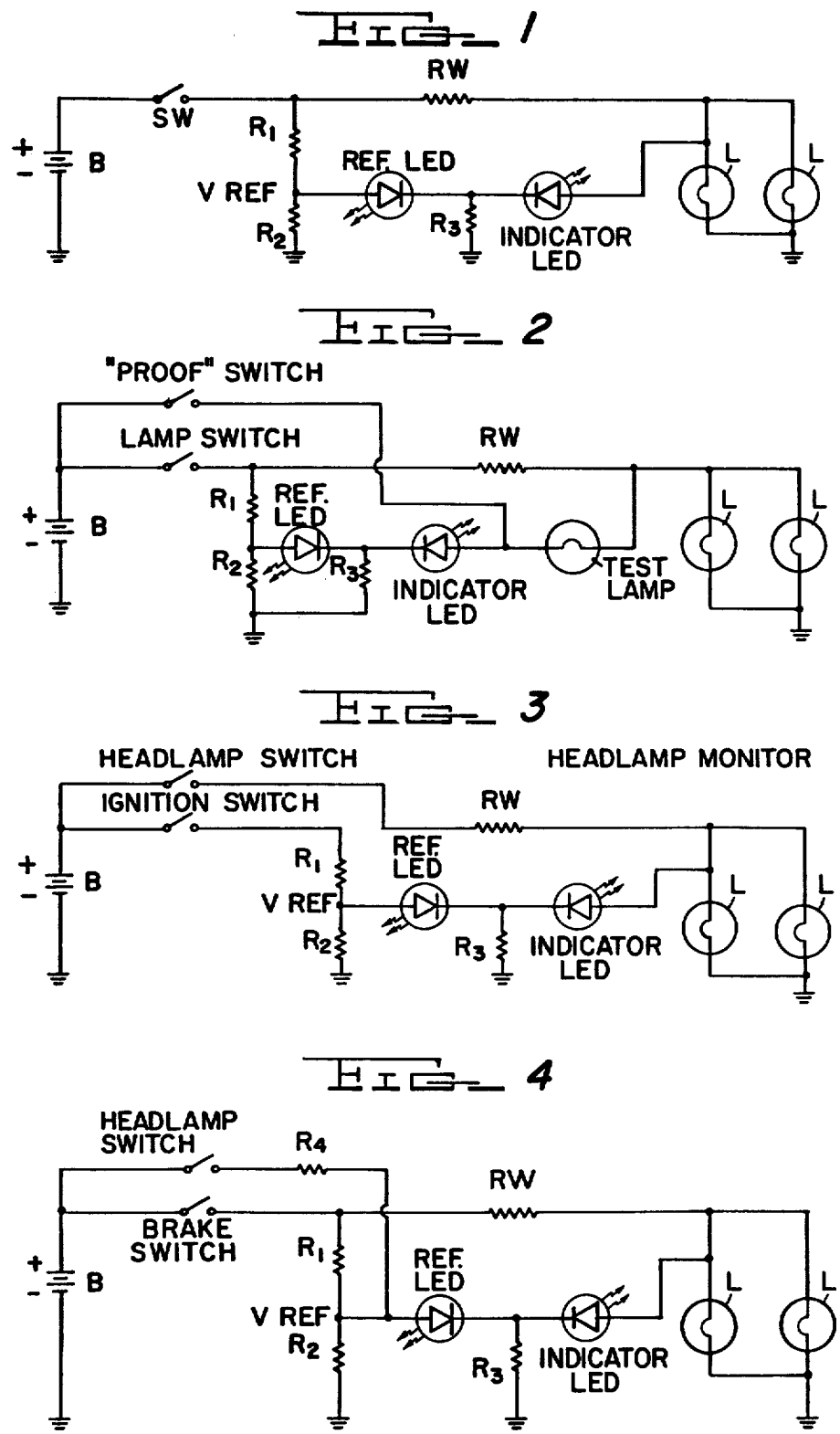

LAMP OUTAGE INDICATOR CIRCUIT

CROSS REFERENCE TO RELATED APPLICATIONS

This application is a continuation in part of earlier copending application Ser. No. 779,662, filed Mar. 21, 1977, now abandoned and entitled LAMP OUTAGE INDICATOR CIRCUIT.

BACKGROUND OF THE INVENTION

As disclosed in Bial et al U.S. Pat. No. 3,774,188 it is old in the art to sense outage of a single lamp by locating the lamp in a bridge circuit and using a semiconductor device in the secondary leg of the bridge circuit to sense the voltage excursion which occurs when the lamp burns out. While the Bial et al device operates satisfactorily in many respects, it suffers from two drawbacks which restrict its use. Firstly, the Bial et al circuit is not sensitive enough to sense outage of one of a pair of parallel connected lamps. Inasmuch as lamps in vehicles are often connected in parallel, the Bial et al circuit is unsuitable for use with such lighting systems. Secondly, the Bial et al circuit is arranged such that the relative values of a reference semiconductor device and sensing semiconductor device are critical for proper operation of the circuit. Thus, with the Bial et al circuit it is necessary to match the characteristics of the sensing semiconductor device with those of the reference semiconductor device either by locating them on a common substrate in an integrated circuit or by selecting and matching discrete components. If the reference and sensing semiconductor devices are not properly matched, inaccurate lamp outage indications may result or an actual lamp outage may not be indicated.

SUMMARY OF THE INVENTION

In accordance with the present invention, the lamp, or pair of parallel connected lamps, which are to be monitored are connected in the primary legs of a resistive bridge circuit while both the sensing semiconductor device and the reference semiconductor device are located in the secondary leg of the bridge circuit. The reference semiconductor device and the sensing semiconductor device are situated in the circuit such that current flow through a common resistor is shifted from one to the other so as to ensure that the sensing semiconductor device is fully turned on when one of the parallel connected lamps fails. In a first embodiment of the invention, the sensing semiconductor device is a light emitting diode (LED) which also provides the indication of lamp outage. In a second embodiment of the invention, the sensing semiconductor device is a transistor which energizes a suitable indicator device, such as an LED, to provide indication of lamp outage.

BRIEF DESCRIPTION OF THE DRAWINGS

In the course of the detailed description of the invention, reference will be made to the drawings, in which:

FIG. 1 is a schematic drawing of a lamp outage indicator circuit in accordance with the present invention.

FIGS. 2-4 are schematic drawings of modifications of the circuit of FIG. 1;

DETAILED DESCRIPTION OF THE PRESENT INVENTION

Figure 5:
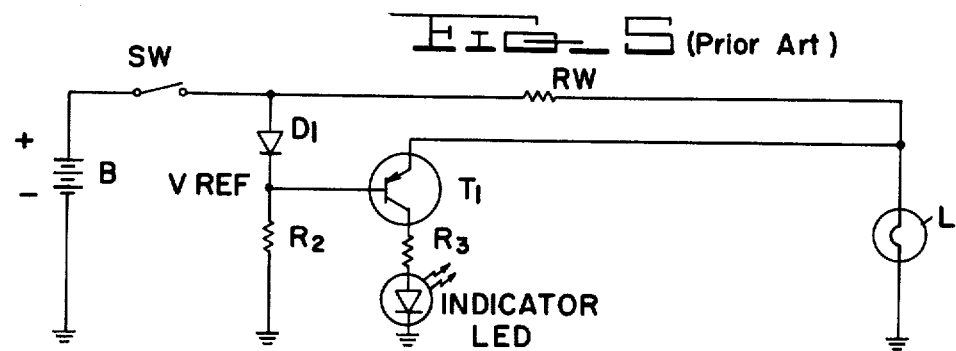
FIG. 5 is a schematic drawing of a prior art lamp outage indicator circuit.

A first embodiment of the present invention is disclosed in FIG. 1. This circuit consists of a battery B and a switch SW which controls power supplied to a pair of parallel connected lamps L through a resistance RW. It will be clear to those skilled in the art as the present discussion proceeds that the invention is equally applicable to sense outage of one of a pair of parallel connected lamps or outage of a single lamp. The resistance RW is of small magnitude and is preferably the resistance of the conductor connecting the switch SW to the lamps, but must be of sufficient magnitude to allow a great enough voltage excursion to occur when a lamp burns out. Typically, in an automobile, the voltage drop across RW is approximately ½ volt. If the voltage drop is substantially less than ½ volt, it is necessary to add an additional resistor to the circuit. Resistance RW and lamps L form a first primary leg of a bridge circuit. A second primary leg of the bridge circuit includes resistors R1 and R2, the relative values of which determine a reference voltage indicated by the label VREF. The secondary leg of the bridge circuit includes a pair of light emitting diodes which are connected in opposing relationship to one another. More particularly, the anode of a reference LED (REF LED) is connected to VREF, and then anode of an INDICATOR LED is connected intermediate resistance RW and lamps L. The cathodes of the REF LED and the INDICATOR LED are electrically connected to a common point as is a current limiting resistor R3 which has its other terminal connected to ground. In the operation of the FIG. 1 embodiment, the relative values of resistors R1 and R2 are chosen so that when both of Lamps L are operative, the INDICATOR LED is biased just below the knee of its conduction curve and the REF LED is biased on.

Since the purpose of R3 is to limit the INDICATOR LED current to a safe level in the unlikely event that both lamps L should burn out at the same time, R3 should be chosen to be of sufficiently large magnitude to provide this limiting function. It has been found that R2 should then be chosen to be smaller than R3 in order to stabilize the operating point of the INDICATOR LED. When the circuit is properly adjusted, it will be seen that the voltage at the junction of the cathodes of the LED's will be accurately determined by the REFERENCE LED. When one (or both) of the lamps L burn out, the voltage level on the anode of the INDICATOR LED will increase enough to bias it to an operating point above the knee of its characteristic curve so that it emits light to indicate that one (or both) of the lamps L are burned out.

It will be appreciated that increasing the voltage on the anode of the indicator LED will cause the indicator to be more forward biased while it causes the REFERENCE LED to be more back biased, thus effectively turning on the INDICATOR LED and turning off the REFERENCE LED. Consequently, when one (or both) of the parallel connected lamps fails, current will shift from the REF LED to the INDICATOR LED, thus indicating that a lamp has failed.

The circuit of FIG. 1 can be implemented by using discrete components. Inasmuch as the circuit is a bridge circuit, it will be noted that voltage fluctuations and/or temperature fluctuations have little effect on the circuit's ability to indicate lamp failure. In addition, it is not necessary to match the characteristics of the REFERENCE LED to those of the INDICATOR LED inasmuch as VREF is adjusted so that the INDICATOR LED is biased just below the knee of its conduction curve and the REFERENCE LED is on when both lamps are operative. Typically, the "knee" of an LED conduction curve occurs at approximately 1½ volts. Accordingly, the circuit is typically adjusted so that when the lamps L are operative there is approximately 1¼ volts across the INDICATOR LED.

FIG. 2 depicts a similar circuit to FIG. 1 but with the addition of a proof circuit to test the condition of the circuit. It will be noted that in FIG. 2 a TEST LAMP has been added between the anode of the indicator LED and the non-grounded side of the lamp array consisting of lamps L. Additionally, a normally open PROOF SWITCH has been added between the positive battery terminal and the anode of the INDICATOR LED. The TEST LAMP is a low wattage lamp so as to prevent high currents from turning on the monitored lamps whenever voltage is applied through the PROOF SWITCH. In operation, circuit of FIG. 2 operates in a similar manner to that of FIG. 1. Since the TEST LAMP is a low wattage lamp, its resistance in the monitoring condition is as low as 3 or 4 ohms so that it does not substantially affect the operation of the circuit. Whenever the PROOF SWITCH is closed the anode of the INDICATOR LED will be brought to the 12 volt level to turn it on, thus indicating that the circuit is operative. The TEST LAMP is additionally turned on and since its resistance in the on state is 50 ohms or so, it effectively isolates the monitored lamps. It should be noted that an isolating resistor cannot be used in place of the test lamp because its resistance would be too great and would desensitize the LED warning circuit under monitoring conditions.

The circuit of FIG. 3 is similar to that of FIG. 1, but in addition, provides a visual warning that the monitored lamps are still burning after a main control switch has been opened. For example, the monitored lamps could be vehicle headlamps and the main control switch could be the ignition switch. Specifically, FIG. 3 differs from FIG. 1 in that a HEADLAMP SWITCH controls current flow to the monitored lamps L and the IGNITION SWITCH controls current flow to the voltage divider and REF. LED. With such a circuit arrangement, it will be appreciated that whenever both switches are closed, the circuit will operate in much the same manner as FIG. 1; that is, whenever one, or both, of the monitored lamps burns out, the INDICATOR LED will be biased so that it emits light. However, if the IGNITION SWITCH is opened and the HEADLAMP SWITCH closed, the INDICATOR LED will emit light to signal the driver that the headlamps are on. If the HEADLAMP SWITCH is open and the IGNITION SWITCH closed, it will be seen that monitored lamps L and INDICATOR LED will remain off.

It is contemplated that the lamp failure indicator of the invention can be used to monitor the condition of any incandescent lamp in an automobile. However, since the cost of providing each such lamp with an outage indicator would be prohibitive, it will be appreciated that only such lamps as the headlamps, brake lights, tail lights, and turn signals which are necessary for the safe operation of the vehicle will be monitored. The circuits thus far described utilize an LED as a voltage sensitive device and an indicating device. Further, since the brightness of the LED's light emission varies with applied voltage it is necessary to provide bias conditions which are sufficient to allow the indicator to be seen when a monitored lamp burns out. There is generally no problem with biasing for a lamp outage indicator for headlamps and tail lights since these lamps are normally operated only at night. However, the brake lights present a problem since they are operated at any time of day. Thus, it is desirable to provide a lamp outage indicator for brake lights in which the indicator is much brighter during the day than at night. The circuit of FIG. 4 provides for such brightness control of the outage indicator device. The circuit of FIG. 4 is essentially the same as FIG. 1 except that the reference voltage VREF is varied depending upon whether it is night or day. In the circuit of FIG. 4, the HEADLAMP SWITCH and a resistor R4 in series therewith are connected to the point VREF. Thus, it will be appreciated that whenever the HEADLAMP SWITCH is closed (normally at night), bias voltage on the REF. LED will be altered so that the INDICATOR LED will not provide as bright an indication as when the HEADLAMP SWITCH is opened.

Other modifications will occur to those skilled in the art. For example, the same principle of shifting current from one semiconductor device to another when lamp outage occurs can be employed in a transistorized version of the invention.

In FIG. 5 a typical prior art transistorized lamp outage circuit is shown. Such a prior art circuit includes a bridge circuit consisting of diode D1, conductor resistance RW and lamp L. The secondary leg of the bridge circuit consists essentially of the base emitter circuit of transistor T1 which has an INDICATOR LED and limiting resistor R3 connected in its collector circuit. It will be seen that in the circuit of FIG. 5, it is necessary to match the relative characteristics of diode D1 and the base emitter junction of transistor T1 in order to be ensured that the transistor is turned on sufficiently to energize the INDICATOR LED. If the characteristics of diode D1 and the base emitter junction of transistor T1 are not carefully matched, it is possible for transistor T1 to be biased in such a manner that failure of lamp L will not cause it to turn on.

Figure 6:
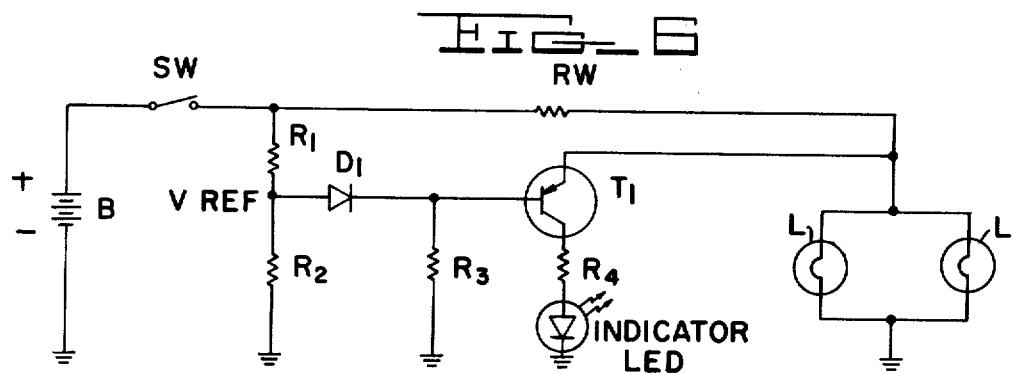
FIG. 6 is a schematic drawing of a second embodiment of the present invention.

FIG. 6 is a transistorized version of the FIG. 1 circuit and represents an improvement over the prior art circuit of FIG. 5. As in FIG. 1, a bridge circuit has a first primary leg comprised of resistors R1 and R2 and has a second primary leg comprised of conductor resistance RW and parallel connected lamps L. A PNP transistor T1 has its emitter lead connected intermediate lamps L and conductor resistance RW and has a limiting resistor R4 and INDICATOR LED connected in its collector circuit. The base lead of transistor T1 is connected to the cathode of a semiconductor diode D1 and to one lead of a resistor R3, the other lead of which is connected to ground. The anode lead of diode D1 is connected intermediate R1 and R2 so as to be responsive to VREF.

The biasing technique for the embodiment disclosed in FIG. 6 is the same as for the embodiment of FIG. 1, the only difference being the fact that transistor T1 and diode D1 have slightly different threshold turn-on characteristics than the LED's of FIG. 1. The relative resistor values for the embodiment of FIG. 6 are still chosen so that the base emitter diode of transistor T1 is just below its turn-on threshold and diode D1 is conducting whenever both lamps L are operative. Failure of either (or both) of lamps L forward biases the base emitter junction of transistor T1 sufficiently to cause it to turn on, thus energizing the INDICATOR LED. The increasing current through the base emitter junction of transistor T1 will cause diode D1 to be back biased and shut off. It will be clear that current shifts from the reference semiconductor device (diode D1) to the sensing semiconductor device (transistor T1) in much the same manner as the FIG. 1 embodiment of the invention.

In the prior art circuit of FIG. 5, it will be noted that the reference voltage VREF is dependent to a great extent on the characteristics of diode D1. When lamp failure occurs, the current through R2 will be sum of the base emitter junction current of transistor T1 and the current through diode D1. The acutal distribution of current through the base emitter junction of T1 and diode D1 depends, to a great extent, on the relative characteristics of the two devices. For example, if diode D1 has a lower impedance than the base-emitter junction of T1, it will draw most of the current and T1 may not be turned on properly. This problem can be exaggerated over the temperature range encountered in vehicles.

In contrast, however, proper operation of the FIG. 6 embodiment of the invention is not highly dependent on the relative characteristics of the two semiconductor devices. Rather, proper operation, is dependent on the characteristics of the bridge circuit which can be easily and reliably designed to provide proper operation without the necessity to match components.

Figure 7:
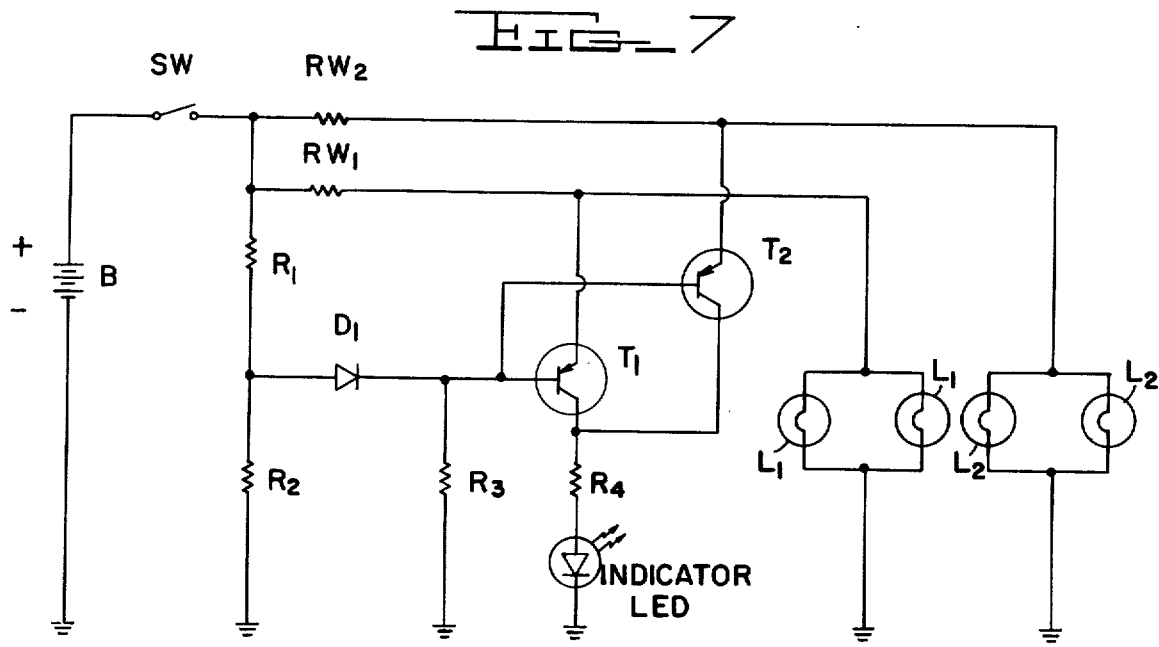
FIG. 7 is a schematic drawing of a modification of the circuit of FIG. 6.

The embodiment of FIG. 6 has the advantage that single indicator and reference devices can be used with a plurality of sensing semiconductor devices to sense and indicate outage of any one of a plurality of lamps located in a plurality of lamp arrays. Such a modification is shown in FIG. 7 which is substantially identical to FIG. 6 with the exception that a second conductor resistance (RW2), as well as a second pair of parallel connected lamps (L2) and a second sensing semiconductor (transistor T2) are added to the circuit. More particularly, it will be noted that the base and collector leads of transistor T2 are connected to the base and collector leads, respectively, of transistor T1 while the emitter lead of transistor T2 is connected intermediate conductor resistance RW2 and the second array of parallel connected lamps L2. Operation of the circuit of FIG. 7 is essentially the same as that of FIG. 6. More particularly, failure of either one (or both) of lamps L1 will cause transistor T1 to energize the INDICATOR LED, while failure of either one (or both) of lamps L2 will also cause the INDICATOR LED to emit light.

The circuit of FIG. 7 can be implemented by using discrete components. Representative values for the components may be as follows, it being understood that these component values are only representative.

| Component | Value |
| --- | --- |
| RW1, RW2 | .355 ohm |
| R1 | 4.7 ohm |
| R2 | 750 ohm |
| R3 | 1000 ohm |
| R4 | 820 ohm |
| D1 | FDH 444 |
| T1 | MPS A56 |
| Indicator LED | TI 228 |
| Lamps L1, L2 | No. 1157 lamp Filaments |

Other modifications will occur to those skilled in the art. The embodiments disclosed in the drawings are intended to be used for exemplary purposes only and are not intended in any way to limit the invention to those particular embodiments disclosed. The scope of the invention is defined in the claims.

What is claimed is:

1. A lamp outage sensing and indicating circuit for sensing and indicating outage of a lamp, comprising:
    a bridge circuit comprising first and second primary legs, said first primary leg comprising a relatively small electrical resistance and said lamp, said second primary leg comprising a pair of resistors;
    a secondary leg connected at one end intermediate said pair of resistors and at the other end intermediate said relatively small electrical resistance and said lamp; said secondary leg comprising reference and sensing semiconductor devices; said reference and sensing semiconductor devices being of the type which exhibit a turn-on threshold voltage above which said device is substantially conductive and below which said device is substantially nonconductive; said reference and sensing semi-conductor devices being connected such that whenever said lamp is operative, said reference semiconductor device is conductive and said sensing semiconductor device nonconductive, and whenever said lamp is inoperative, said sensing semiconductor device is conductive and said reference semiconductor device is nonconductive.

2. The lamp outage sensing and indicating circuit as claimed in claim 1, wherein said reference and sensing semiconductor devices are light emitting diodes.

3. The lamp outage sensing and indicating circuit as claimed in claim 2, further comprising means for testing the condition of said sensing light emitting diode.

4. The lamp outage sensing and indicating circuit as claimed in claim 2, further comprising:
    first electrical switch means for connecting said first primary leg to a source of power; and
    second electrical switch means for connecting said second primary leg to a source of power.

5. The lamp outage sensing and indicating circuit as claimed in claim 2, further comprising:
    means for connecting a source of power to said first and second primary legs; and
    means for altering the voltage at the point intermediate said pair of resistors whereby the brightness of said sensing light emitting diode is able to be varied.

6. The lamp outage sensing and indicating circuit as claimed in claim 1, wherein:
    said reference semiconductor is a semiconductor diode; and
    said sensing semiconductor comprises the base-emitter junction of a transistor.

7. The lamp outage sensing and indicating circuit as claimed in claim 6, further comprising:
    a third primary leg comprising a second relatively small electrical resistance and a second lamp, said third primary leg being connected in parallel with said first and second primary leg; and
    a second sensing semiconductor comprising the base-emitter junction of a second transistor, said second semiconductor being connected intermediate said second relatively small electrical resistance and said second lamp at one end and between said reference semiconductor device and said sensing semiconductor device at the other end.

* * * * *